M. L. JEFFREY.
UNIVERSAL JOINT.
APPLICATION FILED MAR. 22, 1915.
1,155,240.
Patented Sept. 28, 1915.
2 SHEETS—SHEET 1.
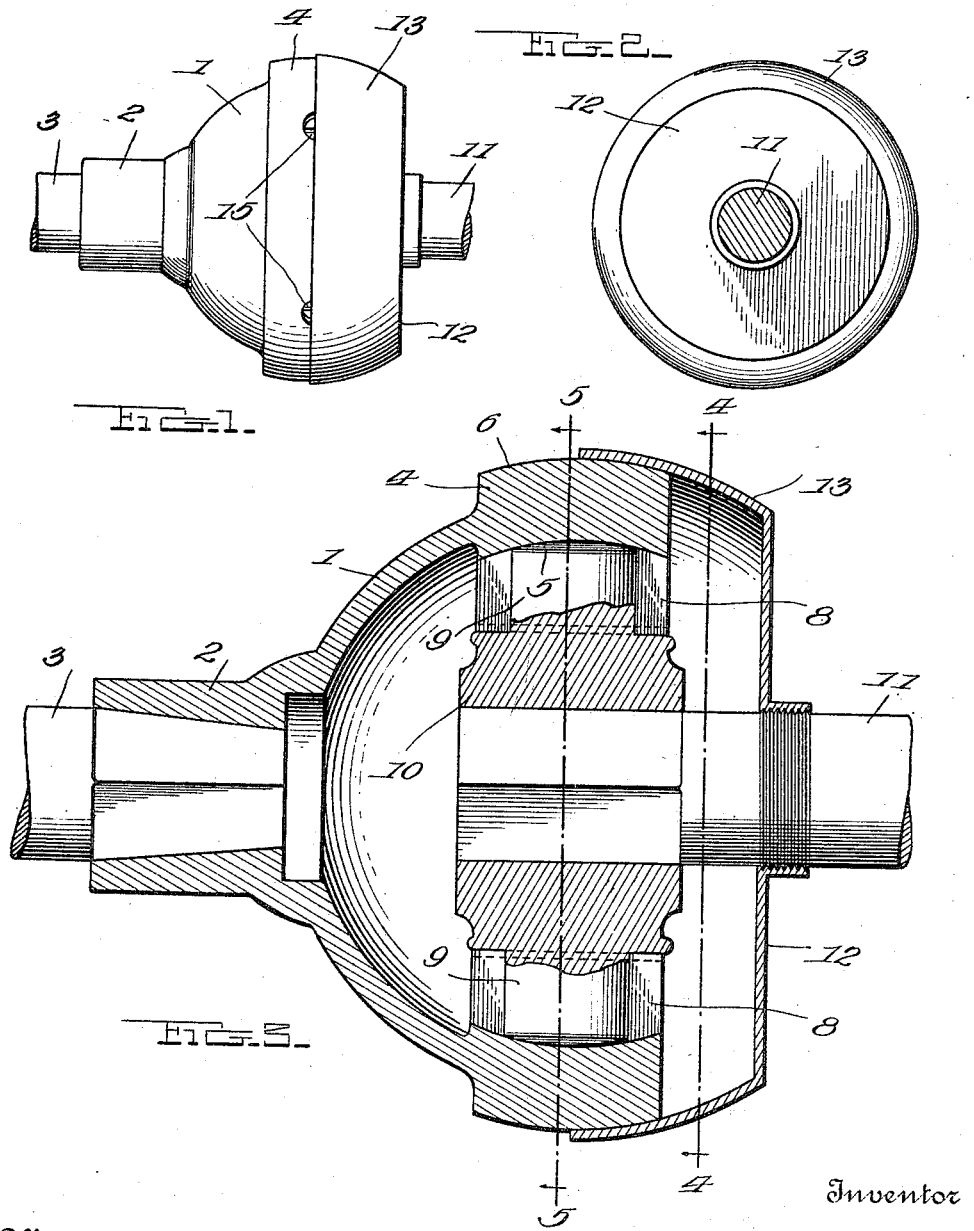

M. L. JEFFREY.
UNIVERSAL JOINT.
APPLICATION FILED MAR. 22, 1915.
1,155,240.
Patented Sept. 28, 1915.
2 SHEETS—SHEET 2.
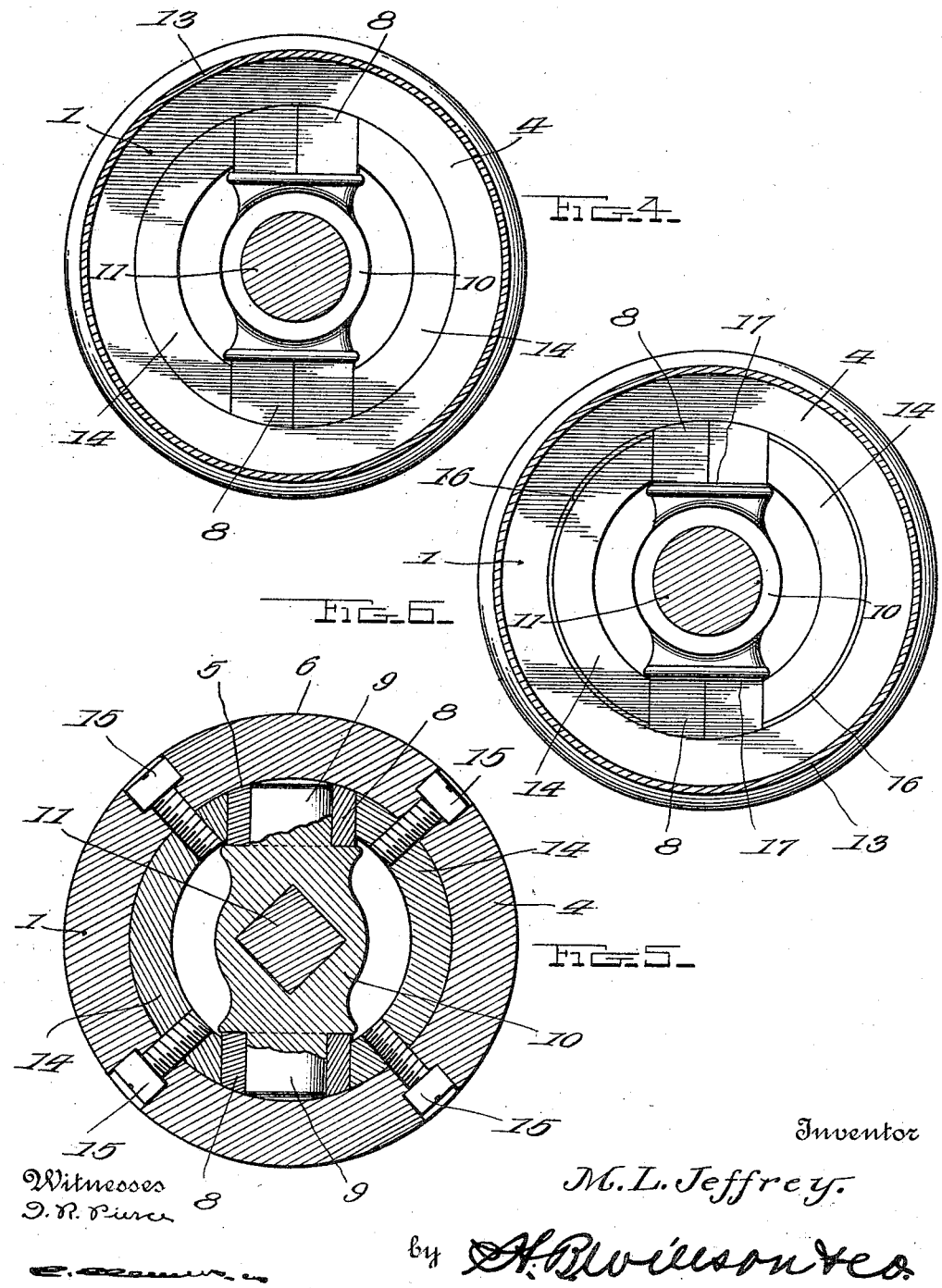
Witnesses
Inventor
M. L. Jeffrey.
by
Attorneys

UNITED STATES PATENT OFFICE.

MAX L. JEFFREY, OF MUNCIE, INDIANA.

UNIVERSAL JOINT.

1,155,240. Specification of Letters Patent. Patented Sept. 28, 1915.

Application filed March 22, 1915. Serial No. 16,104.

*To all whom it may concern:*

Be it known that I, MAX L. JEFFREY, a citizen of the United States, residing at Muncie, in the county of Delaware and State of Indiana, have invented certain new and useful Improvements in Universal Joints; and I do declare the following to be a full, clear, and exact description of the invention, such as will enable others skilled in the art to which it appertains to make and use the same.

My invention relates broadly to improvements in machine elements, and specifically to universal joints.

The object of the invention is to improve upon the general construction of joints of this class to such an extent, as to provide a device which will be simple and efficient in operation, and which will possess a number of highly advantageous features, ample provision being made for properly lubricating the joint at all times.

With this general object in view, the invention resides in certain novel features of construction and combination hereinafter described and particularly pointed out in the claims.

In describing the invention, I shall refer to the accompanying drawings wherein like reference characters designate corresponding parts throughout the several views and wherein:—

Figure 1 is a side elevation of a universal joint constructed in accordance with my invention; Fig. 2 is an end view thereof; Fig. 3 is a central longitudinal section; Figs. 4 and 5 are transverse sections as seen along the planes indicated by the lines 4—4 and 5—5 of Fig. 3; and Fig. 6 is a view similar to Fig. 4, illustrating the application of a plurality of spacing plates to be described.

In these drawings, constituting a part of the application, the numeral 1 designates a cup-shaped or hemispherical member having an axially extending socket 2 receiving a shaft section 3, the open end of the member 1 being thus disposed in a plane lying at right angles to the axis of the shaft 3, this being also the axis of the entire joint as will become apparent as the description proceeds. The edge of the member 1 is thickened to provide a ring 4 whose inner and outer sides are curved longitudinally on concentric arcs described around a point disposed on the axis of the joint. These inner and outer surfaces designated respectively by the numerals 5 and 6 are also curved circumferentially or transversely of the axis, upon concentric arcs described around said axis.

Disposed within the ring 4 and having rounded outer ends contacting with the inner curved surfaces 5, is a pair of two-part bearings 8 having radially disposed bores opening through their inner and outer ends. The two bearings 8 are disposed at diametrically opposite points whereby to aline their bores, the latter then receiving alined studs 9 which are carried by a head 10 disposed within the ring 4. From this head 10, an additional shaft section 11 projects axially away from the member 1, this shaft being passed through the internally threaded hub of a disk 12 which is disposed parallel to the edges of the ring 4. The outer edge of the disk 12 is provided with a continuous laterally extending flange 13 having a curved inner side contacting closely with the curved outer surface 6 of the member 1. It will thus be evident that grease or other lubricating material may be retained within the member 1 by the disk 12 and flange 13, thus insuring that all parts of the joint be properly lubricated at all times.

For the purpose of preventing circumferential movement of the sectional bearings 8 independently of the ring 4, I provide abutments 14 here shown in the form of arcuate plates whose outer sides are curved longitudinally and circumferentially to conform to the inner curvature of the ring 4, while the opposite ends of the plates 14 abut the circumferentially spaced sides of the bearings 8. By this construction, it will be evident that although as the head 10 assumes a position causing the axis of the studs 9 to lie obliquely of the axis of the joint, the bearings 8 are allowed to move longitudinally of the joint or transversely of the ring 4, such bearings are not allowed any circumferential movement in respect to said ring.

In some instances, the abutments 14 might be permanently secured to the ring 4, but it is preferable to releasably secure said abutments to the ring by any preferred means such as the screws 15 shown in the drawings. By thus releasably connecting the abutments to the ring 4, as the ends of the former become worn by continual contact with the bearings 8, the screws 15 may be loosened and arcuate spacing plates 16 may be inserted between said abutments and the ring as shown in Fig. 6, thus compensating for such wear. Furthermore, should the inner and outer ends of the bearings 8 become worn by contact with the head 10 and ring 4, washers or other appropriate spacing plates 17 may be disposed between the inner ends of said bearings and the aforesaid head. By so doing, this wear may be taken up.

From the foregoing description, taken in connection with the accompanying drawings, it will be evident that although an extremely simple construction has been provided for the attainment of the desired end, the joint will be very efficient in operation and will possess a number of highly advantageous features.

In the drawings, I have shown a number of details of construction for producing probably the best results, and in the foregoing description, have described such details. It will be evident, however, that I need not be limited thereto, otherwise than to the extent to which the appended claims limit me.

I claim:—

1. A universal joint comprising a rotatable ring, a pair of bearings disposed adjacent one of the curved sides of said ring at diametrically opposite points and movable transversely of said ring, abutments releasably secured to the ring at circumferentially spaced points and bearing against the circumferentially spaced sides of the bearings, and a rotatable member having diametrically alined studs projecting into the bearings.

2. A universal joint comprising a rotatable ring, a pair of bearings movable transversely thereof and disposed adjacent one of the curved sides of said ring at diametrically opposite points, a pair of arcuate abutments secured to the aforesaid curved side of the ring between the bearings and having their ends disposed in contact with the circumferentially spaced sides of said bearings, and a rotatable member having alined studs projecting into the bearings.

3. A universal joint comprising a rotatable ring, a pair of bearings movable transversely thereof and disposed adjacent one of the curved sides of said ring at diametrically opposite points, a pair of arcuate abutments releasably secured to the aforesaid curved side of the ring between the bearings and having their ends disposed in contact with the circumferentially spaced sides of said bearings, and a rotatable member having alined studs projecting into the bearings.

4. A universal joint comprising a rotatable ring, a pair of bearings disposed within said ring at diametrically spaced points and movable transversely thereof, arcuate abutments secured to the inner side of the ring and contacting at their ends with the circumferentially spaced sides of the bearings, and a head disposed within the ring and having studs projecting into the bearings.

In testimony whereof I have hereunto set my hand in presence of two subscribing witnesses.

MAX L. JEFFREY.

Witnesses:
JOHN W. McMILLAN,
W. P. KOONS.